United States Patent Office 3,219,679
Patented Nov. 23, 1965

3,219,679
THIOLCARBOXYLIC ACID ESTERS AND PREPARATION THEREOF
Gilbert H. Berezin, Walnut Creek, and Guy H. Harris, Concord, Calif., assignors to The Dow Chemical Company, Midland, Mich., a corporation of Delaware
No Drawing. Filed Mar. 29, 1961, Ser. No. 99,041
8 Claims. (Cl. 260—455)

The present invention relates to a new and useful process and to novel compounds prepared by the new process. More particularly the present invention concerns a novel process for preparing thiocarboxylic diesters of aromatic organic compounds.

Certain limited classes of thiocarboxylic acid esters have been prepared by multi-step processes employing chloromethylation, oxidation, conversion to acid halide, then reaction with a thiol to form the ester. The procedures are at best tedious and uneconomical. It would therefore be advantageous to have a single step process. Further, it would be advantageous to be able to employ readily available starting reactants thus realizing economics attendant from commercially available materials. It is the purpose of the present invention to accomplish these and other advantages as will become apparent to those skilled in the art to which the invention pertains from the following description and claims.

It has now been found that an organic thiochloroformate having the formula

RSC(O)Cl wherein R in the above formula represents a member selected from the group consisting of primary alkyl radicals having from 1 to 18 carbon atoms; phenyl radicals; naphthyl radicals; alkaryl radical having from 7 to 18 carbon atoms; primary aliphatic hydrocarbon radicals having a substituent from the class consisting of aryl and cycloalkyl at a position at least two carbon atoms removed from the primary linkage to the sulfur atom, the total number of carbon atoms being from 8 to 18; and, halogenated derivatives of said aforesaid radicals, will react with the class of carbocyclic or heterocyclic aromatic compounds capable of reacting with an acyl chloride in the presence of aluminum chloride known as Friedel-Crafts reaction, in the presence of a metal halide (Friedel-Crafts) catalyst to form a thioester of the carbocyclic or heterocyclic aromatic compounds. Good results are obtained when the reactants are contacted at from about 0° C. to about room temperature and the reaction then continued at a temperature of from about 0° C. to about 100° C. and preferably under substantially anhydrous conditions.

It is to be understood that many carbocyclic or heterocyclic aromatc compounds having at least one replaceable nuclear hydrogen and free of other reactive groups under the conditions of the reaction can be employed in accordance with the present invention. Thus one can employ the nitrogen-, sulfur-, and/or oxygen-containing heterocyclic aromatic and the carbocyclic aromatic compounds which will react with an acyl chloride in the presence of aluminum chloride to form a ketone. Exemplary of the classes of organic compounds having at least one available hydrogen which can be employed as starting reactants in accordance with the present invention are the heterocyclic unsaturated aromatic compounds such as thiophene, furan, and their nuclear substituted aliphatic and halogen derivatives; the aromatic compounds of the benzenoid series; such as benzene, toluene, xylene; the aromatic compounds of the naphthalene series; the diaryl oxides; the diaryl alkanes; the diaryls; the diaryl sulfides, as well as the dibenzothiophenes, and the diphenyl polyoxyalkylenes, and the like, as well as their nuclear aliphatic and halogenated derivatives. Thus one can employ benzene, toluene, m-xylene, bromobenzene, acetanilide, naphthalene, diphenyl, diphenyloxide, diphenyl methane, dibenzyl, diphenylsulfide, dibenzothiophene, isopropylidene diphenyl, and the like to name only a few.

The thiochloroformates which are operative in accordance with the present invention are those having the general formula RSC(O)Cl and may be conveniently prepared in the manner described in United States patent application Serial No. 820,-607, filed July 6, 1959, now abandoned, and are generally understood to be those wherein R in the above formula represents a member selected from the group consisting of primary alkyl radicals having from 1 to 18 carbon atoms; phenyl radicals; naphthyl radicals; alkaryl radicals having from 7 to 18 carbon atoms; primary aliphatic hydrocarbon radicals having a substituent from the class consisting of aryl and cycloalkyl at a position at least two carbon atoms removed from the primary linkage to the sulfur atom, the total number of carbon atoms being from 8 to 18; and, halogenated derivatives of said aforesaid radicals. Thus one can employ phenyl thiochloroformate, naphthylethyl thiochloroformate, cresyl thiochloroformate and the like, or methyl, ethyl, propyl, butyl, phenyl, hexyl, heptyl, octyl, nonyl, decyl, undecyl, nonadecyl, or stearyl thiochloroformate, 2-phenylethyl thiochloroformate, and the like.

In one manner of carrying out the method of the present invention for the preparation of the novel compounds, the aromatic reactant is combined and mixed with the thiochloroformate at between about 0° C. and room temperature in the presence of a Friedel-Crafts catalyst (such as $AlCl_3$, $FeCl_3$, $SnCl_4$, $TiCl_4$ and the like) and the reaction permitted to proceed until the evolution of HCl ceases. The order of addition of the reactants is not critical, some of the desired product being produced with any order of addition. Likewise the ratios in which the reactants are used in not critical. The carbocyclic or heterocyclic aromatic reactant can be employed as a reaction medium as well as any non-polar organic medium which is inactive under the conditions of the reaction. Thus one can employ carbon disulfide, nitrobenzene, ethylene dichloride, as well as other chlorohydrocarbons. However, it is desirable to employ only the carbocyclic or heterocyclic aromatic reactant and from 0 to 50 percent molar excess of the theoretical amount of thiochloroformate necessary to form the desired product. The metal halide (Friedel-Crafts) catalyst is generally employed in from 0 to 25 percent molar excess based on the thiochloroformate. Upon completion of the evolution of the HCl the metal halide intermediate is decomposed in an ice-water mixture in the usual manner in the presence of a hydrochloric acid and the product separated from the solvent and purified by conventional means such as crystallization or distillation.

The following examples illustrate the present invention but are not to be construed as limiting.

*Example 1.—S-ethyl thiobenzoate*

Twenty grams (0.15 mole) anhydrous aluminum chloride was suspended in 35 grams (0.3 mole) benzene in a three-necked 250 ml. round-bottomed flask equipped with stirrer, dropping funnel, a reflux condenser and immersed in a cold-water bath. Fifteen grams (0.12 mole) ethyl thiochloroformate was added slowly while stirring over a fifteen minute period. Considerable HCl evolution was observed. The reaction presumably followed the general equation:

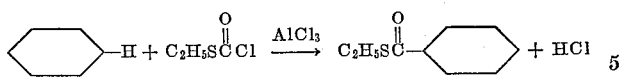

The reaction mixture was maintained in a 50° C. water bath for 1 hour after the addition of reagent was completed. The organic phase containing the product was poured on ice to decompose aluminum chloride complexes present, and was separated by decantation from the aqueous phase. The organic phase was washed with 5 percent aqueous sodium hydroxide and dried over anhydrous sodium sulfate. The benzene solvent was evaporated on a steam bath and the liquid product was distilled to obtain 14.1 grams of pure S-ethyl thiobenzoate boiling at 134–136° C. at 20 mm. mercury pressure, a 71 percent yield based on ethyl thiochloroformate. The identy was verified by infrared analysis.

*Example 2.—S-ethyl 2,4-dimethylthiobenzoate*

Fifteen grams (0.12 mole) ethyl thiochloroformate was added to a mixture of 20 grams (0.125 mole) anhydrous ferric chloride in 53 grams (0.50 mole) m-xylene in the same manner as Example 1. Reaction took place over 2 hours.

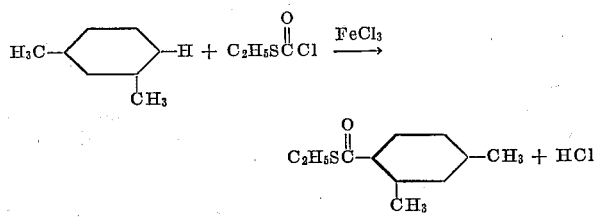

The product mixture was poured into ice, acidified with hydrochloric acid, separated, and washed with 5 percent caustic as before. Distillation at 155° C. at 20 mm. mercury pressure yielded 13.7 grams of yellow oil product, identified as S-ethyl 2,4-dimethylthiobenzoate; a 59 percent yield. Structure was confirmed by infrared analysis.

*Example 3.—S-methyl-p-bromothiobenzoate*

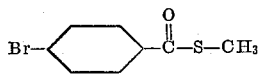

An insoluble complex was formed between 38 grams (0.35 mole) methyl thiochloroformate and 47 grams (0.35 mole) anhydrous aluminum chloride in carbon disulfide. Fifty grams (0.30 mole) bromobenzene in carbon disulfide was added and the reaction proceeded smoothly at room temperature. The reaction products were added to ice and hydrochloric acid and the mixture extracted with pentane. The pentane fraction was distilled to yield S-methyl p-bromothiobenzoate boiling at 120–125° C. at 0.2 mm. mercury pressure. The product was a crystalline solid melting at 38° C.

*Example 4.—S-methyl-4-acetylaminothiobenzoate*

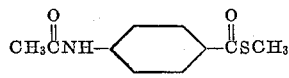

Thirty-five grams (0.26 mole) acetanilide dissolved in carbon disulfide was added to a mixture of 44 grams (0.40 mole) methyl thiochloroformate and 44 grams (0.33 mole) anhydrous aluminum chloride in carbon disulfide, with stirring. The reaction was completed in a hot water bath. The reaction mixture was poured into an ice-water-hydrochloric acid slurry. The solid product was filtered and recrystallized from an ethanol-water mixture to obtain 24 grams (a 44 percent yield) of S-methyl 4-acetylaminothiobenzoate melting at 158–160° C.

*Example 5.—S-methyl 1-thionaphthoate*

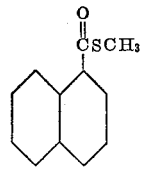

Similarly, 64 grams (0.50 mole) naphthalene was reacted with 58 grams (0.52 mole) methyl thiochloroformate and 75 grams (0.57 mole) anhydrous aluminum chloride in ethylene dichloride solvent. The liquid product was distilled, boiling at 153–155° C. at 1 mm. mercury pressure to obtain S-methyl-1-thionapthoate acid. Infrared analysis indicated that 95 percent of the product was the alpha isomer.

*Example 6.—S-methyl 2-thiophene-thiocarboxylate*

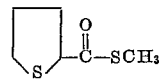

Forty-eight grams (0.36 mole) aluminum chloride was suspended in 200 ml. carbon disulfide at 10° C. Twenty-eight grams (0.33 mole) thiophene and 40 grams (0.36 mole) methyl thiochloroformate were dissolved in 100 ml. carbon disulfide and added to the aluminum chloride over a ½ hour period. The reaction was continued at 10–15° C. for an additional 2 hours and allowed to stand at room temperature for 2 days. The reaction mixture was added to ice, water and hexane and the organic phase separated. After removal of a major part of the solvent on a steam bath, the residue was extracted with hexane. The purified S-methyl 2-thiophene-thiocarboxylate product distilled at 125–126° C. at 19 mm. mercury pressure.

*Example 7.—S-p-chlorophenyl thiophenyl thiobenzoate*

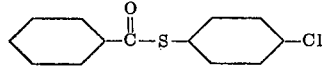

Twenty grams (0.15 mole) anhydrous aluminum chloride was suspended in 150 ml. (132 grams, 1.7 moles) benzene at about 10° C. 20.7 grams (0.1 mole) p-chlorophenyl thiochloroformate was added slowly and the reaction kept cool for one hour. The reaction was then allowed to go to completion in two hours at 60° C., and the mixture was poured in ice water and hydrochloric acid. The benzene layer was separated. The aqueous phase was washed with ether, and the combined organic phase was allowed to evaporate to dryness at room temperature. The crude yield was 23 grams or 74 percent of S-p-chlorophenyl thiobenzoate upon recrystallization from hexane, the melting point was 72–74° C., identical to that of an authentic sample.

*Example 8.—S-dodecyl 4-chlorothiobenzoate*

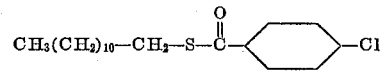

To a slurry of 11.4 grams of AlCl₃ in an excess of chlorobenzene (50 ml.) was slowly added 18 grams of n-dodecyl-thiochloroformate. The stirred slurry was brought to a boil, cooled and poured on excess ice-hydrochloric acid mixture. The organic layer was separated, washed with water until neutral, and subjected to fractional vacuum distillation. The desired product was collected at 163–8° C. at 0.4 mm. mercury pressure. Its structure was confirmed by infrared spectroscopy.

*Example 9.—S,S-dimethyl 4,4'-bis(thiobenzoate)*

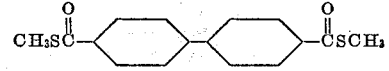

134 grams (1.00 mole) anhydrous aluminum chloride was added to a solution of 110 grams (1.00 mole) methyl thiochloroformate in 500 ml. carbon disulfide, and stirred at 0° C. for ½ hour. Fifty-one grams (0.33 mole) diphenyl in carbon disulfide solution was added to the above mixture over a ½ hour period. The reaction was completed in 2½ hours at temperatures up to about 60° C. The product was recovered as before, and recrystallized from dioxane to give a pure S,S-dimethyl 4,4'-bis(thiobenzoate) melting at 195–197° C. and identified by infrared analysis.

*Example 10.—S,S-dimethyl 4,4'-bis(thiobenzoate)*

Example 6 was repeated except that the solvent used was ethylene dichloride. The reagent quantities used were:

Diphenyl oxide, 75 grams (0.5 mole)
Methyl thiochloroformate, 160 grams (1.45 moles)
Aluminum chloride, 200 grams (1.5 moles)

The reaction was rapid at 0° C. The solid dimethyl 4,4'-bis-thiobenzoate product was recrystallized from toluene and found to have a melting point of 196–197° C.

*Example 11.—S,S-dimethyl 4,4'-oxybis(thiobenzoate)*

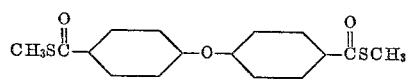

Using the procedure of Example 6, the following were reacted in 120 ml. of carbon disulfide solvent for 3 hours:

Diphenyl oxide, 17 grams (0.1 mole)
Methyl thiochloroformate, 33 grams (0.3 mole)
Aluminum chloride, 40 grams (0.3 mole)

The S,S-dimethyl 4,4'-oxybis(thiobenzoate) product, recrystallized from isopropanol, had a melting point of 123.5–124° C. The yield was 26 grams or 84 percent.

*Example 12.—S,S-dimethyl 4,4'-methylenebis(thiobenzoate)*

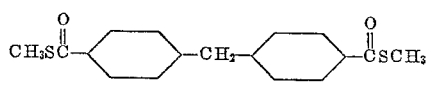

Similarly, 56 grams (0.33 mole) diphenyl methane was reacted with 110 grams (1.00 mole) methyl thiochloroformate and 134 grams (1.00 mole) aluminum chloride in carbon disulfide. The tan solid S,S-dimethyl 4,4'-methylene-bis(thiobenzoate) product, after recrystallization from ethanol, had a melting point of 105–106.5° C. Seventy grams yield was 68 percent of theoretical. Infrared analysis confirmed the identity.

*Example 13.—S,S-dimethyl dithio-2,2'-bi-p-toluate*

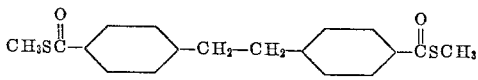

Similarly, 25 grams (0.14 mole) bibenzyl was reacted with 46 grams (0.42 mole) methyl thiochloroformate and 55 grams (0.42 mole) aluminum chloride in 250 ml. carbon disulfide. The solid product, in 65 percent yield, melted at 138–139° C. when recrystallized from isopropyl alcohol.

*Example 14.—S,S-dimethyl 4,4'-thiobis(thiobenzoate)*

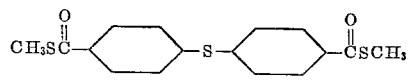

Similarly, 50 grams (0.27 mole) diphenyl sulfide was reacted with 0.71 mole each methyl thiochloroformate and anhydrous aluminum chloride catalyst in carbon disulfide. The solid S,S-dimethyl, 4,4'-thiobis(thiobenzoate) product, recrystallized from isopropyl alcohol, melted at 104–106° C.

*Example 15.—S,S-dimethyl 4,4'-ethylenedioxybis(thiobenzoate)*

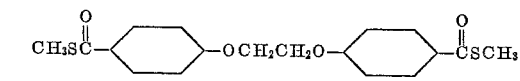

The following reactants were similarly combined in 1000 ml. carbon disulfide at 5° C.:

Diphenoxyethane, 50 grams, 0.25 mole
Methyl thiochloroformate, 83 grams, 0.75 mole
Aluminum chloride, 100 grams, 0.75 mole The reaction was continued for 18 hours at room temperature and one additional hour at about 50° C. The reaction mixture was added to ice and acid, filtered, and recrystallized from butanol to obtain a S,S-dimethyl 4,4'-ethylenedioxybis(thiobenzoate) product having a melting point of 175–177° C.

The following example illustrates an alternative method for preparing the new compounds of the present invention:

*Example 16.—S,S-dimethyl dithio-4,4'-stilbenedicarboxylate*

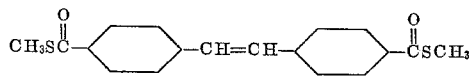

To a solution of 37.6 grams (0.1 mole) of the dipotassium salt of dithio-4,4'-stilbenedicarboxylic acid in 95 percent ethanol is added 28.4 grams (0.2 mole) of methyl iodide. Addition of water precipitates the desired ester. Recrystallization of the solid can be carried out if desired. The product contains about 19.5 percent of sulfur by weight.

The compounds prepared by the method hereinbefore described are useful as monomeric precursors in forming polymers.

The novel compounds of the present invention are useful as the active ingredient in agricultural herbicides and are particularly useful as aquatic herbicides. The compounds have been tested and found to control the growth of *Cabomba caroliniana* and *Salvinia rotundefolia* when introduced into the water adjacent the growing plants at concentrations of 100 parts per million parts of water. Some of the compounds are also useful as the active ingredient in compositions for the control of root knot nematode and others show promise as the active ingredient in compositions for the control of many insects.

We claim:

1. A process which comprises reacting by contacting a thiochloroformate having the formula

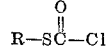

wherein R in the above formula represents a member selected from the group consisting of a primary alkyl radical having from 1 to 18 carbon atoms; phenyl radical; naphthyl radical; alkaryl radical having from 7 to 18 carbon atoms; primary aliphatic hydrocarbon radical having a substituent from the class consisting of aryl and cycloalkyl at a position at least two carbon atoms removed from the primary linkage to the sulfur atom, the total number of carbon atoms being from 8 to 18; and, halogenated derivatives of said aforesaid radicals with an aromatic compound capable of being acylated in a Friedel-Crafts reaction selected from the group consisting of carbocyclic and heterocyclic aromatic compounds, at a temperature of from about 0° to about 100° C. in the presence of a metal halide Friedel-Crafts catalyst under substantially anhydrous conditions; and, recovering a thioester of the aromatic compound.

2. A compound having the formula

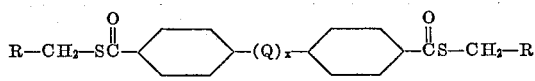

wherein R represents a member selected from the group consisting of hydrogen and a lower aliphatic hydrocarbon radical having from 1 to 4 carbon atoms, and Q represents a member selected from the group consisting of alkylene; alkylidene;

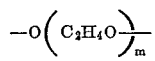

and O and S, $x$ represents an integer from 0 to 1 and $m$ represents an integer from 1 to 2.

3. S,S-dimethyl 4,4'-bis(thiobenzoate).
4. S,S-dimethyl 4,4'-methylenebis(thiobenzoate).
5. S,S-dimethyl dithio-$\alpha,\alpha'$-bi-p-toluate.
6. S,S-dimethyl 4,4'-oxybis(thiobenzoate).
7. S,S,-dimethyl 4,4'-thiobis(thiobenzoate).
8. S,S-dimethyl 1,2-di(oxethylene-4,4'-thiobenzoate).

References Cited by the Examiner

Coppock, W. H.: Jour. Org. Chem., vol. 22 (1957), pp. 325–6.

Thomas: "Anhydrous Aluminum Chloride," pp. 204, 205, 211, 212.

CHARLES B. PARKER, *Primary Examiner.*

IRVING MARCUS, *Examiner.*